Patented Apr. 15, 1947

2,419,157

UNITED STATES PATENT OFFICE 2,419,157

PREPARATION OF ETHYLENEBISIMINO-DIACETIC ACID AND SALTS THEREOF

Edryd Gwylfa Parry, Blackley, Manchester, England, assignor to Imperial Chemical Industries Limited, a corporation of Great Britain No Drawing. Application July 21, 1944, Serial No. 546,059. In Great Britain July 28, 1943

7 Claims. (Cl. 260—534)

This invention relates to a process for the manufacture of ethylenebisiminodiacetic acid and salts thereof.

It has been proposed to manufacture ethylenebisiminodiacetic acid by a process whereby ethylenediamine is condensed with the sodium salt of monochloracetic acid in presence of sodium carbonate.

It has also been proposed to manufacture polyamino carboxylic acid nitriles or the corresponding acids or derivatives thereof, by a process which comprises causing hydrocyanic acid and aldehydes or ketones to act on primary or secondary polyamines, preferably in the presence of catalysts, while using hydrocyanic acid and aldehydes or ketones in such molecular proportions that at least 2 nitrile radicles are introduced in the molecule and if desired saponifying the nitriles obtained. For example ethylene diamine is condensed with formaldehyde and hydrogen cyanide in presence of calcium cyanide to give ethylenebisiminodiacetonitrile which may be hydrolysed to give ethylenebisiminodiacetic acid.

We have now found that ethylenebisiminodiacetic acid can be made directly from ethylene dihalides by interacting them with salts of iminodiacetic acid.

According to the invention, therefore, we provide a process for the manufacture of ethylenebisiminodiacetic acid which comprises reacting an ethylene dihalide with a water-soluble salt of iminodiacetic acid.

Ethylene dihalides which may be used according to the invention include ethylene dichloride and ethylene dibromide.

Water-soluble salts of iminodiacetic acid which it is preferred to use are the alkali metal or ammonium salts. Iminodiacetic acid may be made according to the method described by Eschweiler (Annalen, 1894, 278, 230) whereby the corresponding dinitrile is produced by the interaction of hydrogen cyanide and hexamethylenetetramine and is then hydrolysed with baryta.

Interaction of the ethylene dihalide and the iminodiacetic acid salt may be carried out in presence of an acid-binding agent, but such an agent is not essential. The interaction is desirably brought about in presence of a solvent and for this purpose water, dioxan or a mixture of dioxan and water are suitable. If desired emulsifying agents may be used to facilitate dispersion of the ethylene dihalide in cases where the solvent is such as not to dissolve this halide. Suitable emulsifying agents include the sulphated long chain fatty alcohols and sulphonated unsaturated fatty acids for example oleic acid. The reaction is but slow at atmospheric temperature and advisedly it is conducted at a higher temperature for example at 80–100° C. under reflux. The reaction may, if desired, be carried out at pressures greater than the atmospheric.

Ethylenedisiminodiacetic acid may be isolated from the reaction product by acidification or, by evaporation of the reaction product there may be obtained the salt thereof. The material so obtained may be used for example for dissolving lime soaps.

The invention is illustrated but not limited by the following examples in which the parts are by weight:

Example 1

10.6 parts of iminodiacetic acid, 50 parts of water and 8.6 parts of sodium carbonate are stirred together until a solution is obtained. To this solution 4.4 parts of ethylene dichloride are added and the mixture is stirred and heated under reflux at 85–90° C. during 20 hours. It is then cooled to atmospheric temperature, 11.6 parts of concentrated hydrochloric acid are added and the mixture is then further cooled to 0° C. Ethylenebisiminodiacetic acid crystallises out and is filtered off, washed and dried.

Example 2

10.6 parts of iminodiacetic acid, 200 parts of water, 150 parts of dioxan and 12.7 parts of sodium carbonate are stirred together until a solution is obtained. To this solution 4 parts of ethylene dichloride (which corresponds to 0.5 mole of ethylene dichloride per mol of iminodiacetic acid) are added and the mixture is stirred under reflux at 85–90° C. during 20 hours. The solution is then concentrated by evaporation to about a seventh of its volume, 10 parts of concentrated hydrochloric acid are added and the mixture is cooled to 0° C. Ethylene bisiminodiacetic acid crystallises out and is filtered off, washed and dried.

Example 3

26.6 parts of iminodiacetic acid, 150 parts of water and 10.6 parts of sodium carbonate are stirred together until a solution is obtained. 10 parts of calcium carbonate and 12.4 parts of ethylene dichloride are then added and the mixture is heated under reflux with stirring at 75–80° C. during 36 hours. It is then cooled to atmospheric temperature, 35.4 parts of concentrated hydrochloric acid are added and the mixture is then further cooled to 0° C. when ethylenebisiminodiacetic acid crystallises out and is filtered off, washed and dried.

Example 4

19.8 parts of ethylene dichloride are added to a solution of 26.6 parts of iminodiacetic acid (which corresponds to one mol of ethylene dichloride per mol of iminodiacetic acid) in 150 parts of water containing also 31.8 parts of sodium carbonate. The mixture is stirred under reflux and heated in an oil-bath of temperature 115° C.–125° C. until the temperature of the mixture reaches 100° C. It is then evaporated to dryness on a boiling water bath and the residue is ground to a fine powder which contains, besides inorganic salts, the sodium salt of ethylenebisiminodiacetic acid.

Example 5

9.9 parts of ethylene dichloride are added to a solution of 13.3 parts of iminodiacetic acid in 75 parts of water containing also 20.7 parts of anhydrous potassium carbonate. The mixture after stirring and heating as described in Example 4 is cooled to atmospheric temperature, treated with 26.5 parts of concentrated hydrochloric acid and further cooled to 0° C. when ethylenebisiminodiacetic acid crystallises out and is filtered off, washed and dried.

Example 6

18.8 parts of ethylene dibromide are added to a solution of 13.3 parts of iminodiacetic acid in 75 parts of water containing also 15.9 parts of sodium carbonate. The mixture is stirred under reflux and heated in an oil bath at 115° C.–125° C. during 42 hours. Ethylenebisiminodiacetic acid is then isolated from the reaction mixture as described in Example 5.

Example 7

12.4 parts of ethylenedichloride are added to a solution of 26.6 parts of iminodiacetic acid in 150 parts of water containing also 21.2 parts of sodium carbonate and 0.2 part of sulphonated oleic acid. This mixture is stirred under reflux and heated in an oil-bath at 115°–125° C. until the temperature of the mixture reaches 100° C. The mixture is then cooled to atmospheric temperature, 35.4 parts of concentrated hydrochloric acid are added and the mixture is further cooled to 0° C., when ethylenebisiminodiacetic acid crystallises out, is filtered off, washed and dried.

I claim:

1. Process for the manufacture of ethylenebisiminodiacetic acid which comprises heating at a temperature of about 75° to 100° C. an ethylene dihalide with a water-soluble salt of iminodiacetic acid.

2. Process according to claim 1 wherein the ethylene dihalide is ethylene dichloride and the salt of iminodiacetic acid is the sodium salt.

3. In a process for the preparation of salts of ethylenebisiminodiacetic acid the step which comprises reacting an ethylene dihalide with iminodiacetic acid in the presence of an acid-binding agent in aqueous solution, whereby a product containing a salt of ethylenebisiminodiacetic acid is obtained.

4. In a process for the preparation of salts of ethylenebisiminodiacetic acid the step which comprises reacting an ethylene dihalide with iminodiacetic acid at a temperature of about 80° C. to 100° C. in an aqueous medium in the presence of a metal carbonate of the class consisting of sodium carbonate, potassium carbonate and calcium carbonate, whereby a mixture containing the ethylenebisiminodiacetic acid salt of the said metal is produced.

5. In a process for preparing a mixture containing the sodium salt of ethylenebisiminodiacetic acid the step which comprises heating ethylene dichloride with iminodiacetic acid at a temperature of about 80° C. to 100° C. in an aqueous medium in the presence of sodium carbonate, and evaporating the resulting mixture to dryness whereby a residue containing inorganic salts and the sodium salt of ethylenebisiminodiacetic acid is obtained.

6. In a process for preparing a mixture containing the sodium salt of ethylenebisiminodiacetic acid the step which comprises heating about 19.8 parts by weight of ethylene dichloride with a solution of about 26.6 parts of iminodiacetic acid in 150 parts of water containing also about 31.8 parts of sodium carbonate at a temperature of about 100° C., and evaporating the resulting mixture to dryness whereby a residue containing inorganic salts and the sodium salt of ethylenebisiminodiacetic acid is obtained.

7. In a process for preparing compounds of the class consisting of ethylenebisiminodiacetic acid and water-soluble salts thereof, the step which comprises heating an ethylene dihalide at a temperature of about 80° to 100° C. with iminodiacetic acid in an aqueous medium in the presence of a metal carbonate of the class consisting of sodium carbonate, potassium carbonate, and calcium carbonate.

EDRYD GWYLFA PARRY.

REFERENCES CITED

The following references are of record in the file of this patent:

UNITED STATES PATENTS

| Number | Name | Date |
| --- | --- | --- |
| Re. 22,352 | Teeters | July 20, 1943 |
| 2,168,181 | Ulrich et al. | Aug. 1, 1939 |
| 2,261,002 | Ritter | Oct. 28, 1941 |
| 2,206,249 | Daimler et al. | July 2, 1940 |
| 2,097,864 | Platz et al. | Nov. 2, 1937 |

FOREIGN PATENTS

| Number | Country | Date |
| --- | --- | --- |
| 446,737 | British | April 21, 1936 |

OTHER REFERENCES

Hofmann, Beilstein (Handbuch der Org. Chem.), (4th ed., vol. 4, 1922), page 251.

Duvillier, Beilstein (Handbuch der Org. Chem.), (4th ed., vol. 4, 1922), page 393.